L. L. TATUM.
MOTOR CONTROLLER.
APPLICATION FILED JAN. 8, 1913.

1,141,154.

Patented June 1, 1915.
2 SHEETS—SHEET 2.

Witnesses
J. L. Johnson
Rekla Bast

Inventor
Lewis L. Tatum
By Edwin B. Tower Jr.
Attorney

UNITED STATES PATENT OFFICE.

LEWIS L. TATUM, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROLLER.

1,141,154.      Specification of Letters Patent.      Patented June 1, 1915.

Application filed January 8, 1913. Serial No. 740,760.

*To all whom it may concern:*

Be it known that I, LEWIS L. TATUM, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to improvements in controllers for electric motors.

My invention is particularly applicable to the control of motor operated washing machines and other machinery which it is desired to intermittently operate in opposite directions. It should be understood, however, that certain features of my invention may be used in various other relations for various different purposes.

In order to fully and clearly disclose the nature and advantages of my invention I shall describe the embodiments thereof illustrated in the accompanying drawings, it of course being understood that my invention is susceptible of modifications.

Figure 1:
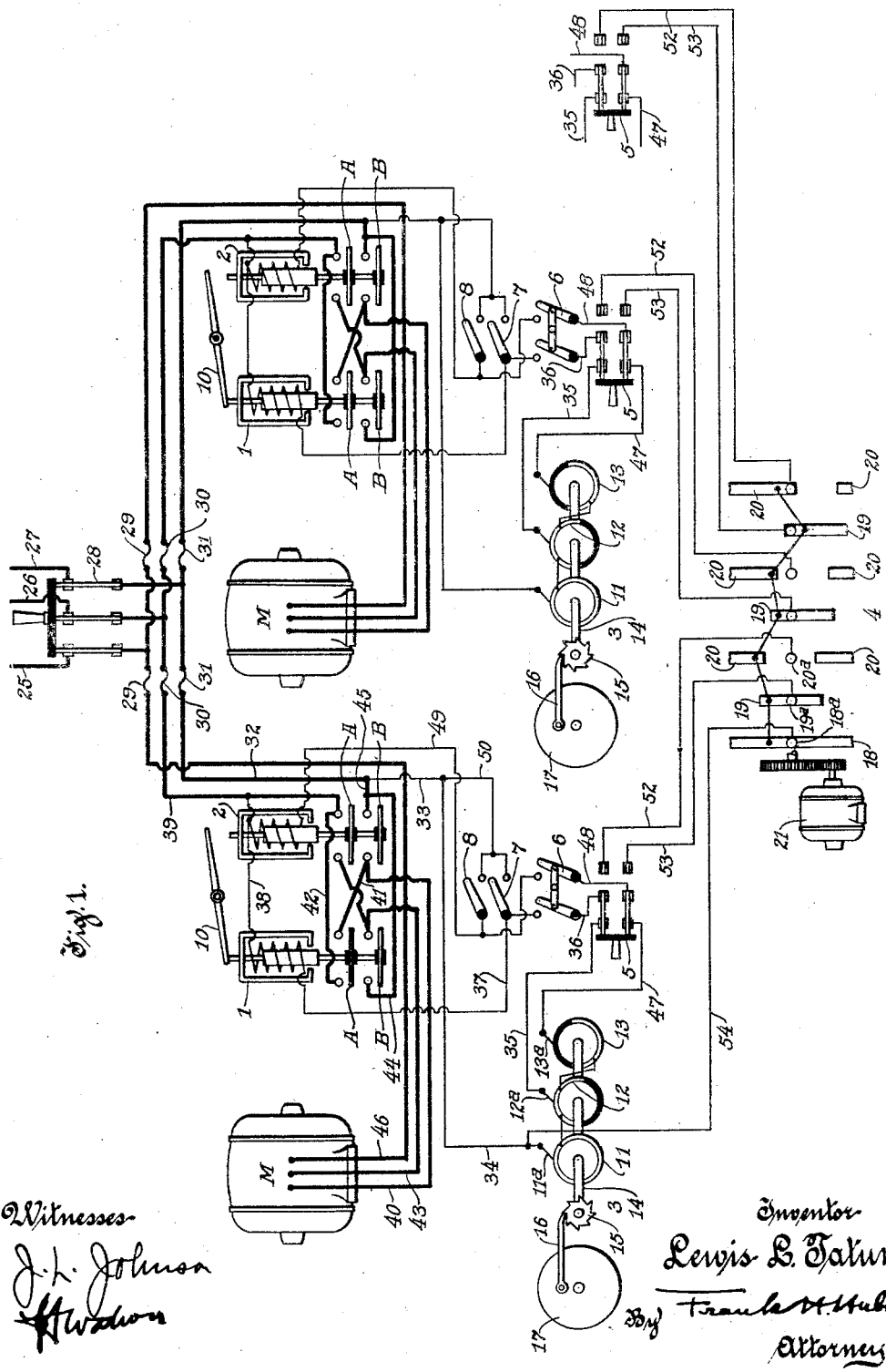
Figure 2:
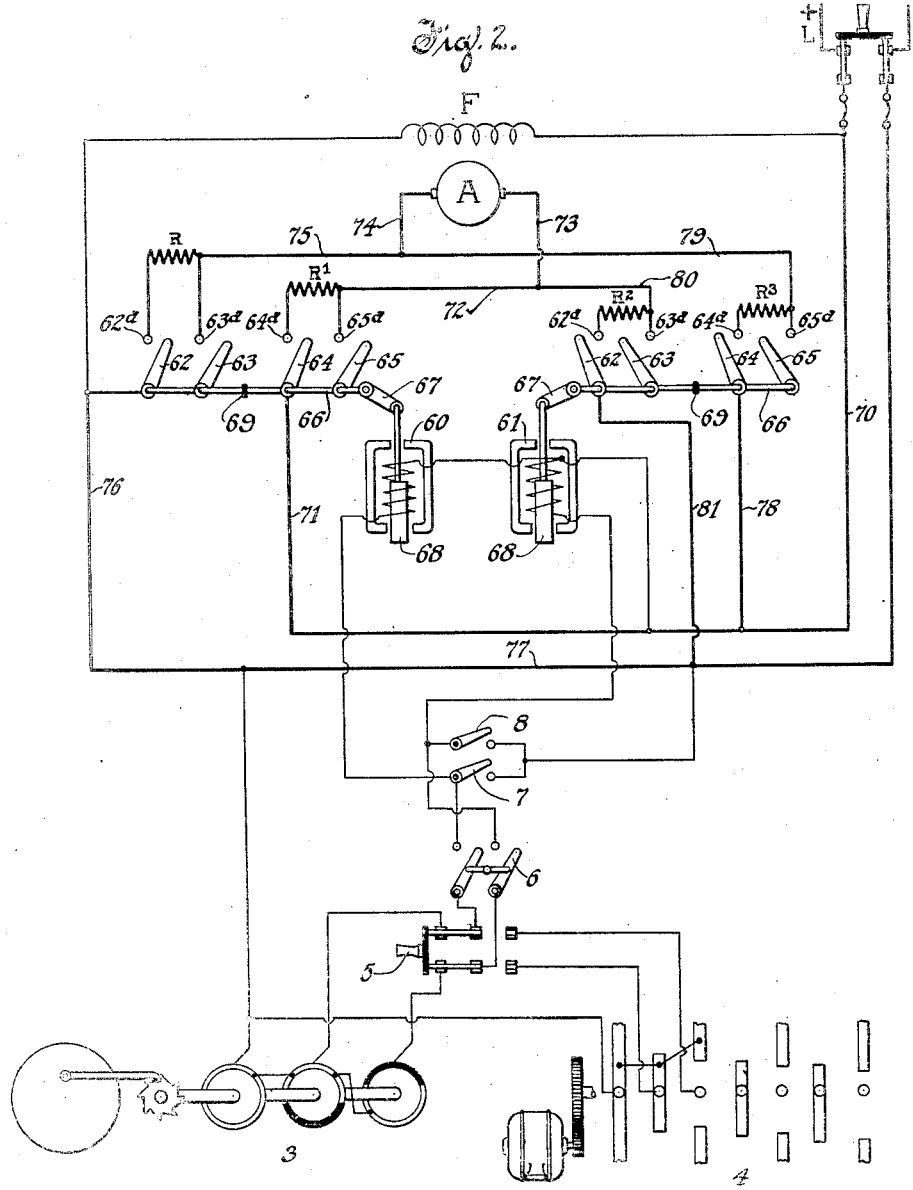

In the accompanying drawings, Figure 1 is a diagrammatic view of a controller for machines operated by alternating current motors. Fig. 2 is a diagrammatic view of a controller for machines operated by direct current motors.

The motors M shown in Fig. 1 are of the three-phase alternating current type, but of course in practice they might be of any other desired type. For the purpose of the following description it may be assumed that the motors M operate separate washing machines, which it is desired to periodically reverse after a predetermined number of revolutions of the motors in each direction.

Each controller includes switches 1 and 2 controlling the continuity of the motor circuit and the direction of the flow of current through the motor. One serves to cause its respective motor to operate in a forward direction and the other serves to cause the motor to operate in a reverse direction. A pilot switch 3 operated by the driven machine or by the driving motor serves to alternately energize the switches 1 and 2 to insure the periodic reversals of the motor. The controller also includes a second pilot switch 4 adapted to control a group of independently operated machines. The two motors M are controlled in an identical manner by their respective pilot switches 3 and are jointly controlled through similar circuits by the master pilot switch 4. A description of a single motor and its control will accordingly suffice to disclose the operation and control of all the motors. A double-pole double-throw switch 5 is provided to connect the switches 1 and 2 to either the individual pilot switch 3 or the group pilot switch 4. A double-pole switch 6, which in practice is preferably of the snap type, is provided for stopping and starting the motor at will. In addition to the foregoing, the controller is also provided with normally open push-buttons 7 and 8 controlling the operating windings of the switches 1 and 2 independently of the pilot switches. By means of these switches the motor may be started in either direction at will. The motor will continue to operate in the same direction as long as the push button is held closed. The provision of these push-buttons is very advantageous where the controller is used for washing machines of the type having separate compartments in the washing drum. In such machines it is often desired to move the drum into a position to give access to some particular compartment. The attendant can tell from the position of the drum which direction of operation will most quickly bring the drum into the desired position and can thus readily bring the drum in the desired position by operation of the proper push-button. On the other hand, should he attempt to move the drum by operation of the mechanism through the pilot switch the machine might be started in just the reverse direction to that desired, depending upon the position of the pilot switch.

In practice, the switches 1 and 2 may be of any preferred type. As illustrated, they are of the double-pole type, being provided with movable contacts A and B, each coöperating with a set of stationary contacts. These switches are preferably interlocked to prevent both being closed at the same time. Any preferred form of interlocking means may be employed for this purpose. The interlock shown merely comprises a pivoted bar 10 coöperating with extensions on the plungers of the operating solenoids of the switches 1 and 2 to lock the plunger of either switch against operation, upon operation of the other.

In practice, the pilot switch 3 may be of any preferred type. As schematically illustrated in the drawing, it comprises contact rings 11, 12 and 13 mounted upon a revoluble shaft 14. The rings 11, 12 and 13 have coöperating brushes 11ª, 12ª and 13ª respectively. The ring 11 comprises a continuous conductor, while the rings 12 and 13 have insulating portions extending slightly less than half-way around the same. The rings 12 and 13 are so disposed with respect to one another on the shaft 14 that conducting section of each will engage its respective contact brush just prior to the disengagement of the conducting section of the other from its respective brush. Thus, as the shaft 14 is rotated, the circuits through the rings 12 and 13 are completed and broken alternately. The shaft 14 has keyed thereto a ratchet wheel 15 with which engages a reciprocating ratcheting bar 16 pivoted eccentrically to the reversing drum 17 of the operated machine. With this arrangement the shaft 14 is revolved in a step by step manner in a single direction so long as the driven machine is in operation. Of course, in practice the pilot switch 3 might be operated from either the machine or the driving motor in any other preferred manner.

The group pilot switch 4 may in practice be of the ring type similar to the pilot switch 3 or any other preferred type. As illustrated, it is of the ring type, but in order to simplify the illustration thereof the rings have been shown as flat segments with the insulated sections omitted. This switch is provided with a continuous ring 18 corresponding to the ring 11 of the pilot switch 3 and with a plurality of pairs of rings 19 and 20 corresponding to the rings 12 and 13 of the pilot switch 3. Each pair of rings 19 and 20, as will later be apparent, is adapted to control a separate machine and, of course, the pilot switch 4 may be provided with as many pairs of these rings as there are machines to be controlled. As will be observed from the drawing the several pairs of rings 19 and 20 are staggered. The purpose of this arrangement will be hereinafter set forth. The pilot switch 4 is preferably driven continuously by independent means such as a motor 21. Current is supplied to the motor and to the operating windings of the switches 1 and 2 from the source of alternating current supply, the lines of which have been designated as 25, 26 and 27. A triple-pole switch 28 is provided for connecting the controller to the source of supply and fuses 29, 30 and 31 are connected in the different phases of the circuit.

I shall now describe the operation of the controller at the same time clearly setting forth the circuit connections: Assume that the switch 5 is in the position illustrated connecting the controller to the individual pilot switch 3 and that the main switch 28 is closed. Assume now that the switch 6 is closed. This completes a circuit from main line 27 by conductors 32, 33 and 34 to brush 11ª of the pilot switch 3, thence to the ring 11 across to the ring 12 and brush 12ª, by conductor 35, through one side of the double-pole switch 5, by conductor 36, through one side of the switch 6, by conductor 37 to the operating winding of switch 1, by conductor 38 to conductor 39 and thence to main line 26. The switch 1 thereupon responds and closes the motor circuit. The motor circuit upon closure of the switch 1 may be traced as follows: One phase extends from the left hand terminal by conductors 40 and 41 through the contact A of switch 1, by conductors 42 and 39 to line 26. Another phase may be traced from the center terminal of the motor by conductor 43 through contact B of switch 1, by conductors 44 and 45 to conductor 32 and thence to line 27. The third phase may be traced from the right hand terminal of the motor by conductor 46 to main line 25. The motor is thus set in operation driving the machine in one direction until the conducting portion of the ring 12 of the pilot switch 3 disengages the brush 12ª. This results in opening the circuit of the switch 1, which drops, thereby disconnecting the motor from circuit. However, just before this circuit is broken the conducting portion of the ring 13 engages the brush 13ª, which completes the energizing circuit of the switch 2. The circuit of the switch 2 may be traced from ring 11 of the pilot switch to ring 13 and brush 13ª, by conductor 47, through one side of the switch 5, by conductor 48, through one side of the switch 6, by conductor 49, through the operating winding of switch 2 to conductor 38, which is connected to line 26. Thus, as soon as the switch 1 opens the switch 2 immediately closes again completing the motor circuit but reversing the flow of current therethrough. Upon closure of the switch 2, the left-hand terminal of the motor is connected to line 27 instead of line 26 as previously set forth, while the central terminal is connected to line 26 instead of to line 27 as above described. The motor being thus reversed drives the machine in a reverse direction until the pilot switch operates a sufficient distance to break circuit between the ring 13 and brush 13ª and again complete circuit through ring 12 and brush 12ª. When this occurs the switch 1 is again energized, thereby again reversing the motor. This cycle of operation is repeated so long as the switch 6 is left closed or until one of the push buttons 7—8 is closed.

Assume now that the switch 6 is open and that push-button 7 is closed. This completes a circuit from conductor 32, by conductor 50, through the push-button 7, by conductor 37, through the opertaing winding of switch 1, thereby starting the motor, as already described. The motor will run in the same direction until the switch 7 is released, whereupon the switch 1 will be deenergized and disconnect the motor from circuit. Closure of the push button 8 completes a circuit from conductor 50, by conductor 49, through the operating winding of switch 2 to line 26, causing said switch to respond and start the motor in an opposite direction to that just described. The motor remains in operation until the push button is released. It will thus be seen that by means of the push buttons 7 and 8 the motor may be started in either direction at will without regard to the position of the pilot switch. While, of course, the switch 6 should be opened when it is desired to control the motor by the push buttons yet no injury could result from pressing the buttons while the switch 6 was closed. Assume now that it is desired to control the motor from the group pilot switch 4. The switch 5 should be thrown over to the right. This connects conductor 36, which leads to the operating winding of switch 1 to a conductor 52, which is connected to the brush 20$^a$ of one of the rings 20 which corresponds to the ring 12 of the pilot switch 3. It also connects the conductor 48 to a conductor 53, which leads to the brush 19$^a$ of one of the rings 19, which corresponds to the ring 13 of the pilot switch 3. The brush 18$^a$ of the continuous ring 18 is connected by conductor 54 to conductor 34. Thus when the driving motor of the group pilot switch is set in operation and the switch 6 closed the motor M will be set in operation and thereafter periodically reversed in the same manner as that described in connection with the individual pilot switch 3. Assuming now that there were a plurality of separate controllers such as that illustrated and that each controller was connected to one set of the contacts 19 and 20 by its respective throw-over switch 5. It is obvious that the group pilot switch would serve to periodically reverse all of the separate machines. As is well understood in the art, an electric motor in starting takes more current than when operating at normal speed. It will thus be seen that if a single group pilot switch was used to control a large number of machines and reversed all of the machines at the same time there would be a very heavy demand on the source of supply at the instant of reversal. To meet this condition and to avoid excessive power demand upon the generating plant I have provided the group pilot switch and arranged the sets of contacts 19 and 20 in a staggered relation. By connecting all of the machines to one pilot switch and staggering the sets of contacts it will be obvious that the machines will be reversed at different times according to the angular positions of their respective sets of contact rings on the shaft of the pilot switch. As illustrated, the pilot switch would reverse the machines successively and this of course would result in decreasing the load peaks.

The controller shown in Fig. 2 is essentially like that shown in Fig. 1 except for the switches controlling the motor. The motor shown in this instance is of the shunt wound type, being provided with an armature A and a field winding F. Also in this instance the motor is provided with starting resistances R, R', R$^2$ and R$^3$. The motor is controlled by switches 60 and 61. In practice these switches may be of various different types. As illustrated, each comprises four switch arms, 62, 63, 64 and 65, having coöperating contacts designated by the same reference numerals with the exponent $a$. The switch members are mounted upon a shaft 66 connected by a link 67 to the plunger of an operating solenoid 68. The switch members 62 and 63 are insulated by means of an insulating coupling 69 from the switch members 64 and 65. The switch members 62 and 64 are arranged to close circuit simultaneously in advance of the switch member 63 which in turn is in advance of switch member 65. The remainder of the controller is precisely like that shown in Fig. 1 except that circuits are D. C. instead of A. C. Also the pilot switches and other switches control the opertaing windings of the motor controlling switches 60 and 61 in the same manner as that previously described. It will, therefore, only be necessary to describe the motor circuit connection. Assuming that the switch 60 is first operated, circuit is first closed from line L by conductors 70 and 71 through switch arm 64 of switch 60, through the resistance R', by conductors 72 and 73, through the motor armature in a left hand direction, by conductors 74 and 75, through resistance R and switch arm 62 to conductor 76 and thence by conductor 77 to line L'. The field winding F is permanently connected to line L' and conductor 76 so that as soon as the motor circuit is closed the motor is set in operation but with the resistance R and R' connected in its armature circuit. When, however, the switch 60 is operated to its full extent the switch arms 63 and 65 engage respective contacts 63$^a$ and 65$^a$ short circuiting the resistances R and R' in two steps. This brings the motor up to normal speed. The motor continues to operate in the same direction until the switch 60 is deënergized and the switch 61 is energized. This completes a circuit from conductor 70 by conductor 78, through the switch arm 64 of switch 61, through resistance $R^3$ and conductors 79 and 74 through the motor armature in a right hand direction by conductors 73 and 80 through the resistance $R^2$ to switch arm 62 of switch 61 by conductor 81 to conductor 77 and line $L'$. The flow of current through the armature being thus reversed the motor will now be operated in opposite direction to that previously described. Again protective resistance is included in the armature circuit when the motor is started. However, as soon as the switch 61 operates to its full extent the arms 63 and 65 thereof will engage their respective contacts, short-circuiting the resistance $R^2$ and $R^3$ in two steps thereby bringing the motor up to normal speed.

What I claim as new and desire to secure by Letters Patent is:

1. In a controller for a plurality of electric motors, in combination, a plurality of reversing means, one for each motor, and automatic means for controlling said former means to effect operation thereof at different times.

2. In a controller for a plurality of electric motors, in combination, a plurality of reversing means, one for each motor and automatic means for controlling said former means to effect operation thereof successively to reverse the motors successively.

3. In a controller for electric motors, in combination, reversing means for a motor, a device effecting operation of said means periodically, a second device adapted to similarly control a plurality of said means, and means for operatively connecting said reversing means to either of said devices to be controlled thereby independently of the other.

4. In combination, a motor, reversing means therefor, a device operated by said motor to control said means to periodically reverse said motor, a second independently operated device adapted to similarly control a plurality of said reversing means, and means for operatively connecting said reversing means to either of said devices.

5. In a controller for electric motors, in combination, reversing means, an automatically operated device associated with said means to cause periodic reversals of the motor controlled thereby, manually controlled means associated with said former means to operate the motor in either direction at will and means for disconnecting first mentioned means from said device.

6. In a controller for electric motors, in combination, motor reversing means, an automatic device for controlling said means to periodically reverse the motor, manually operated means to cause a continuous operation of the motor in either direction at will and means for disconnecting said former means from said device, said manually controlled means when released causing the motor to be stopped if said first mentioned means and said device are disconnected.

7. In a controller for electric motors, in combination, motor reversing means, an automatic device for controlling said means to periodically reverse the motor, manually operated means to cause a continuous operation of the motor in either direction at will, and means for disconnecting said former means from said device, said manually controlled means when released causing the motor to be stopped if said first mentioned means and said device are disconnected and restoring said first mentioned means to the control of said device if said first mentioned means and said device are connected.

8. In a controller for a plurality of electric motors, in combination, a set of electro-responsive switches for effecting operation of one motor in either direction, an automatically operated device adapted to control the energizing circuits of said switches to effect reversal of the motor controlled thereby periodically; a second automatically operated device adapted to similarly control a plurality of said sets of switches for the other motors, and a switch adapted to subject said first-mentioned switches to the control of either of said devices.

9. In a controller for a plurality of electric motors, in combination, a set of electro-responsive switches for effecting operation of one motor in either direction, an automatically operated device adapted to control the energizing circuits of said switches to effect reversal of the motor controlled thereby periodically, a second automatically operated device adapted to similarly control a plurality of said sets of switches for the other motors, and a single double-pole, double-throw switch for connecting said set of switches to either of said devices to be controlled thereby.

10. In a controller for electric motors, in combination, electro responsive switches adapted to cause the motor to operate in either direction, means controlling the energizing circuits of said switches to cause periodic reversals of the motor controlled by said switches and control switches in circuit with the operating windings of said electro responsive switches to control the same at will independently of said second mentioned means.

11. In a controller for electric motors, in combination, electro responsive switches to cause the motor to operate in either direction, means controlling the energizing circuits of said switches to cause said switches to periodically reverse the motor controlled thereby, means for disconnecting the operating windings of said switches from said former means and switches in circuit with the operating windings of said electro responsive switches to control the same independently of said first mentioned means to cause continuous operation of the motor in either direction.

12. In a controller for electric motors, in combination, electro responsive switches to cause the motor to operate in either direction, means controlling the energizing circuits of said switches to cause said switches to periodically reverse the motor controlled thereby, means for disconnecting the operating windings of said switches from said former means and switches in circuit with the operating windings of said electro responsive switches to control the same independently of said first mentioned means to cause continuous operation of the motor in either direction, said control switches when released returning to initial position.

In witness whereof, I have hereunto subscribed my name in the presence of two witnesses.

LEWIS L. TATUM.

Witnesses:
F. H. HUBBARD,
TEKLA BEST.